(No Model.)
H. F. JUERGENS.
EGG BEATER.
No. 499,741. Patented June 20, 1893.
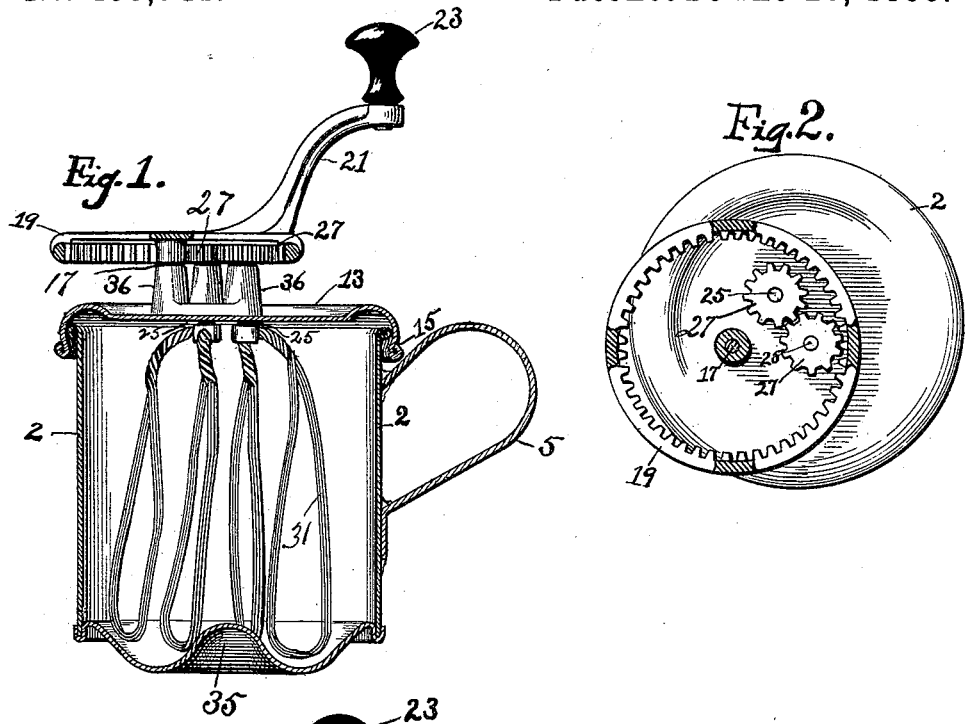
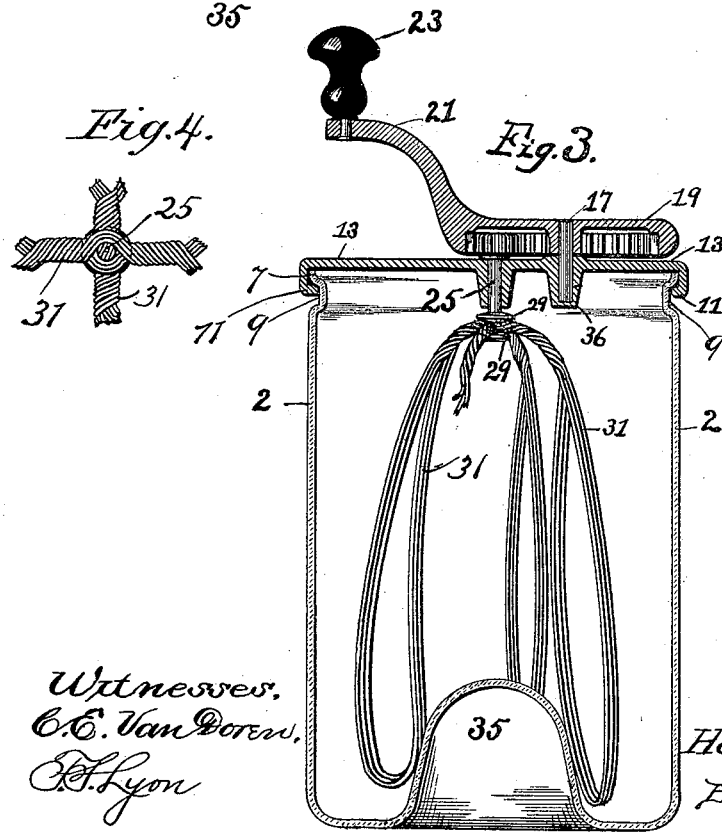
Witnesses.
C. E. Van Doren.
C. F. Lyon
Inventor,
Henry F. Juergens.
By Paul A. Merwin
Attorneys.

UNITED STATES PATENT OFFICE.

HENRY F. JUERGENS, OF MINNEAPOLIS, MINNESOTA.

EGG-BEATER.

SPECIFICATION forming part of Letters Patent No. 499,741, dated June 20, 1893.

Application filed September 1, 1891. Serial No. 404,456. (No model.)

*To all whom it may concern:*

Be it known that I, HENRY F. JUERGENS, of Minneapolis, in the county of Hennepin and State of Minnesota, have invented certain Improvements in Beaters and Mixers, of which the following is a specification.

The object of the invention is to provide a device that may be used either as an egg or cake beater, a drink mixer, a cream whipper, an ice-cream freezer, or a churn and the invention consists generally in the construction and combination hereinafter described and particularly pointed out in the claims.

In the accompanying drawings, forming a part of this specification, Figure 1 is a vertical section of my improved device. Fig. 2 is a plan view showing the driving gear in section. Fig. 3 is a vertical section showing only one series of whippers. Fig. 4 is a detail showing arrangement of wires on a stud.

In the drawings, 2 represents a suitable receptacle which may be in the form of a cup having a handle 5, as shown in Fig. 1 or in the form of a closed jar as shown in Fig. 3. In either case the top is preferably provided with a ring or flange 7 and it may have a recess 9 as shown in Fig. 4 through which a lug 11 on the cover 13 may be passed as shown in Fig. 4 or the cover may have a spring flange 15 as shown in Fig. 1 which springs over the flange on the receptacle, this being merely a precaution from slipping when the beater is operated. The cover is provided with two or more vertical bearings and in one of these bearings is arranged a stud 17 upon which is mounted the internal gear wheel 19 provided with the crank arm 21 and handle 23. As shown in Figs. 1 and 2 studs 25 are journaled in the cover 13 and each is provided upon its upper end with a pinion 27. These pinions gear together and one of them intermeshes with the teeth on the gear 19. The lower end of each of the studs 25 is provided with the two washers or collars 29 which are secured to the shaft by soldering or otherwise and leave a space or groove between them. The whippers 31 are formed of spring steel wires preferably tinned and each pair of whippers consists of several wires forming a double loop passed over the stud 25 between the washers 29 and then twisted together thereby forming a loop that closely encircles the stud 25 between the washers or collars 29. This construction enables the wire loop where it encircles the stud 25 to be soldered to the collars or washers at both the top and bottom as well as to the stud so that a simple and yet strong and durable connection is effected between the wire loop, the stud and the two collars or washers and makes the same capable of being easily washed and thoroughly cleaned.

Where I use two studs 25 as shown in Figs. 1 and 2 I preferably use only two whippers upon each stud and these whippers are arranged so as to turn toward each other and to alternately pass by and recede from one another as they rotate. In other words this arrangement by which the whippers of one stud will stand in a concentric circle to the whippers of the other stud will cause the whippers in their rotation not only to move toward and then recede from each other but also in alternation to pass inside and then outside of the path described by the others which results in a thorough agitation and mixing of the contents of the receptacle. The receptacle is preferably formed with a raised center 35 and the ends of the whippers pass around this center as shown in Figs. 1 and 3. These whippers are curved as shown so as to pass each other as before described and at their lower ends are free from any connection with the bottom of the vessel so that they are free to travel in their course without interference with each other and without being attached by pivots or otherwise to the bottom of the vessel. The projection 36 on the cover in which the bearings for the studs 17 and 25 are formed may be projected downwardly on the under side of the cover as shown in Fig. 3 or they may project upwardly as shown in Fig. 1.

Having thus described my invention, I claim as new and desire to secure by Letters Patent—

1. In a beater or mixer, the combination with a receptacle, of the whippers and the operating gear, the stud of the operating gear being provided with two collars one above the other to form a space between them and the strands of the whippers being looped around the stud between said collars and secured to the upper and the lower collars, substantially as and for the purposes described.

2. In a beater or mixer, the combination with the receptacle and operating gear for the whippers, of the studs projecting from the operating gear into the receptacle, and the whippers formed of strands secured to said studs, at their upper ends and curved outwardly therefrom with their lower portions formed into loops and free from connection to the bottom of the receptacle, the whippers of one stud standing eccentrically to the whippers of the other stud, and the whippers of the two studs in their rotation passing alternately inside and then outside of the path described by each, substantially as and for the purposes described.

In testimony whereof I have hereunto set my hand this 28th day of August, 1891.

HENRY F. JUERGENS.

In presence of—
F. S. LYON,
J. JESSEN.